United States Patent [19]
Miyazaki

[11] Patent Number: 5,525,862
[45] Date of Patent: Jun. 11, 1996

[54] ELECTRO-OPTICAL DEVICE

[75] Inventor: Shigeki Miyazaki, Kanagawa, Japan

[73] Assignee: Sony Corporation, Tokyo, Japan

[21] Appl. No.: 377,499

[22] Filed: Jan. 24, 1995

Related U.S. Application Data

[63] Continuation of Ser. No. 260,666, Jun. 16, 1994, abandoned, which is a continuation of Ser. No. 837,961, Feb. 20, 1992, abandoned.

[30] Foreign Application Priority Data

Feb. 20, 1991 [JP] Japan .................. 3-047784

[51] Int. Cl.$^6$ .................................. H01J 17/04
[52] U.S. Cl. ................ 313/582; 313/494; 313/584; 313/586; 313/610; 345/60
[58] Field of Search .................... 313/494, 484, 313/582, 584, 586, 587, 610; 359/36, 48, 54, 80; 345/60, 37; 365/111, 116

[56] References Cited

U.S. PATENT DOCUMENTS

| | | | |
|---|---|---|---|
| 3,755,027 | 8/1973 | Gilsing | 313/491 X |
| 3,894,264 | 7/1975 | Andoh et al. | 313/586 X |
| 4,048,533 | 9/1977 | Hinson et al. | 313/484 X |
| 4,896,149 | 1/1990 | Buzak et al. | 340/794 |
| 5,077,553 | 12/1991 | Buzak | 345/60 X |
| 5,107,182 | 4/1992 | Sano et al. | 313/587 X |
| 5,164,633 | 11/1992 | Kim et al. | 313/581 |
| 5,182,489 | 1/1993 | Sano | 313/586 X |

FOREIGN PATENT DOCUMENTS

| | | |
|---|---|---|
| 1350676 | 12/1963 | France . |
| 0047932 | 2/1987 | Japan . |
| 1-217396 | 1/1988 | Japan . |
| 0221996 | 4/1990 | Japan . |
| 0065031 | 5/1990 | Japan . |
| 1348204 | 3/1974 | United Kingdom . |

*Primary Examiner*—Sandra L. O'Shea
*Assistant Examiner*—Ashok Patel
*Attorney, Agent, or Firm*—Hill, Steadman & Simpson

[57] ABSTRACT

An electro-optical device applied as an image display device includes a first substrate having a plurality of non-overlapping first electrodes on a major surface thereof; and a second substrate opposed to the first substrate and having a plurality of non-overlapping second electrodes on a major surface thereof wherein the second electrodes are disposed substantially perpendicular to the first electrodes. This device further includes an electro-optical material layer disposed between the first and second electrodes; and a discharge chamber disposed between the electro-optical material layer and the second substrate, and filled with an ionizable gas, the discharge chamber having a plurality of scanning units, the scanning units being divided by partition walls formed by a printing process. By formation of grooves by the printing process, the difficult process of etching of grooves or formation of electrodes in the grooves is unnecessary, and the manufacturing is easy. This is advantageous to implementation of large display screens or miniaturization.

22 Claims, 4 Drawing Sheets

ELECTRO-OPTICAL DEVICE

This is a continuation of application Ser. No. 08/260,666, filed Jun. 16, 1994, now abandoned, which is a continuation of application Ser. No. 07/837,961, filed Feb. 20, 1992, now abandoned.

BACKGROUND OF THE INVENTION

1. Field of the Invention

This invention relates to an electro-optical device in an image display adapted to drive an electro-optic material layer which uses plasma to select pixels.

2. Description of the Related Art

As the means for providing, for example, a liquid crystal display with high resolution and high contrast, there is generally provided active elements, such as transistors, etc. to drive every display pixel (which is referred to as an active matrix addressing system).

In this case, however, since it is necessary to provide a large number of semiconductor elements such as thin film transistors, the problem of yield results particularly when the display area is enlarged, giving rise to the great problem that the cost is necessarily increased.

Thus, as the means for solving this, Buzak et al. have proposed in the Japanese Laid Open Application No. 217396/89 publication a method utilizing discharge plasma in place of semiconductor elements such as MOS transistors or thin film transistors, etc. as an active element.

The configuration of an image display device for driving a liquid crystal by making use of discharge plasma will be briefly described below.

This image display device is called a Plasma Addressed Liquid Crystal display device (PALC). As shown in FIG. 6 of the present drawings, a liquid crystal layer 101 serving as an electro-optic material layer and plasma chambers 102 are adjacently arranged on an opposite side of a thin dielectric sheet 103 comprised of glass, etc.

The plasma chambers 102 are constituted by forming a plurality of grooves 105 in parallel to each other in a glass substrate or base plate 104. These chambers are filled with an ionizable gas. Further, pairs of electrodes 106 and 107 are provided in the grooves 105 in parallel to each other. These electrodes 106 and 107 function as an anode and a cathode for ionizing the gas within the plasma chambers 102 to generate a discharge plasma.

The liquid crystal portion of the display has the liquid crystal layer 101 held between the dielectric sheet 103 and a transparent base plate 108. On the surface of the transparent base plate 108 at the liquid crystal layer 101 side are formed transparent electrodes 109. These transparent electrodes 109 are perpendicular to the plasma chambers 102 constituted by the grooves 105. The locations where the transparent electrodes 109 and the plasma chambers 102 intersect with each other correspond to respective pixels.

In the above-mentioned image display device, by switching and scanning the plasma chambers 102 in sequence where a plasma discharge is to be carried out, and applying signal voltages to the transparent electrodes 109 on the liquid crystal layer 101 side in synchronism with the switching scan operation, these signal voltages are held by respective pixels. The liquid crystal layer 101 is thus driven.

Accordingly, the grooves 105, i.e., plasma chambers 102 respectively correspond to one scanning line, and the discharge region is divided every scanning unit.

In image display devices utilizing discharge plasma as described above, an enlarged display area is more easily realized than larger areas utilizing semiconductor elements, but various problems arise in putting such a device into practice.

For example, forming the grooves 105 which constitute the plasma chambers 102 on the transparent glass substrate 104 raises considerable manufacturing problems. In particular, it is extremely difficult to form such grooves at a high density.

Further, it is required to form the electrodes 106 and 107 which generate the discharge in the grooves 105. However, an etching process which form the electrodes is troublesome, and it is difficult to maintain the spacing between electrodes 106 and 107 accurately.

SUMMARY OF THE INVENTION

With the above-mentioned problems with such prior arts in view, the present invention has been proposed, and its object is to provide an electro-optical device applied as an image display device that is simple to manufacture and suitable for implementation as a large display surface and with highly miniaturized components.

To attain the above-described and other objects, there is provided in accordance with this invention an electro-optical device comprising: a first substrate having a plurality of non-overlapping first electrodes on a major surface thereof; a second substrate opposed to the first substrate and having a plurality of non-overlapping second electrodes on a major surface thereof, the second electrodes being disposed substantially perpendicular to the first electrodes; an electro-optical material layer disposed between the first and second electrodes; and a discharge chamber disposed between the electro-optical material layer and the second substrate, and filled with an ionizable gas, the discharge chamber having a plurality of scanning units, the scanning units being divided by partition walls formed by printing.

There may be also provided an addressing structure comprising: a substrate having a plurality of electrodes on a major surface thereof; a dielectric material layer opposed to the substrate; and an ionizable gas filled between the substrate and the dielectric material layer, the ionizable gas defining a discharge region which provides scanning units divided by partition walls formed by printing.

In the image display device of this invention, partition walls dividing the discharge area every scanning unit are formed by the printing process. The printing process is a very simple technique, and permits formation of a fine pattern. Thus, the productivity and/or working efficiency can be improved to a higher degree as compared to the groove forming method.

Further, since the second electrodes for discharge are formed on a flat substrate, etching process is also simple, and the distance between electrodes can be controlled with high accuracy.

DETAILED DESCRIPTION OF THE PREFERRED EMBODIMENTS

An actual embodiment to which this invention is applied will now be described in detail with reference to the attached drawings.

Figure 1:
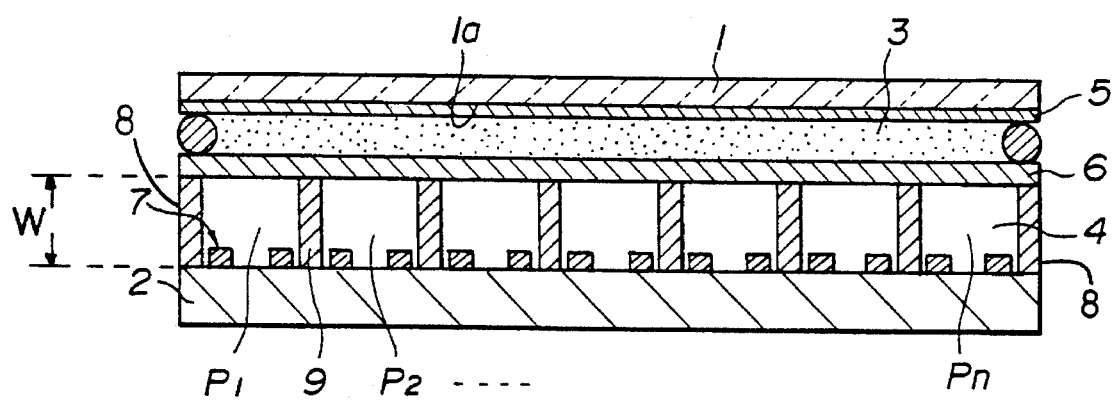
FIG. 1 is a schematic cross sectional view showing an embodiment of an electro-optical device according to the principles of the present invention.

An embodiment of an image display device is shown in FIG. 1, in which a liquid crystal layer 3 serving as an electro-optic material layer is provided between a flat and optically sufficiently transparent first substrate 1 and a similarly flat and transparent second substrate 2. A space between the liquid crystal layer 3 and the second base plate 2 is utilized as a discharge chamber 4.

Here, these base plates 1 and 2 are both formed of a non-conductive and optically transparent material since the image display device in this embodiment is of the transmission type. However, in the case where the image display device is a direct-viewing or reflection type display device, it is sufficient that only one base plate is transparent.

Strip-shaped electrodes 5 are formed on one major surface 1a of the first substrate 1, and a liquid crystal layer 3 comprised of a nematic liquid crystal, etc. is arranged in contact with the electrodes 5. This liquid crystal layer 3 is held between a thin dielectric film 6 comprised of glass, mica, or plastic, etc. and the first base plate 1. There is thus provided a configuration in which so called liquid crystal cells are constituted by the first base plate 1, the liquid crystal layer 3, and the dielectric film 6.

The above-mentioned dielectric film 6 functions as an insulating shield layer between the liquid crystal layer 3 and the discharge chamber 4. If there is no dielectric film 6, there is the possibility that the liquid crystal material may flow into any discharge chamber 4, or the liquid crystal material may be polluted by gas from the discharge chamber 4. It is to be noted that where a solid-state or encapsulated electro-optic material, etc. is used in place of the liquid crystal material, such a dielectric film 6 may not be required.

In addition, since the dielectric film 6 is formed by dielectric material, the dielectric film 6 itself also functions as a capacitor. Accordingly, in order to ensure sufficient electric coupling between the discharge chamber 4 and the liquid crystal layer 3 and to suppress two-dimensional diffusion of charges, it is desirable that the dielectric film 6 be as thin as possible.

Discharge electrode groups 7 are formed as a strip-shaped electrodes on the second substrate 2. Peripheral portions of the second substrate 2 are supported by sealing spacer members 8, at a predetermined spacing from the dielectric film 6. Thus, a space is formed between the second substrate 2 and the dielectric film 6 serves as a discharge chamber or region in which the discharge plasma is generated.

This discharge chamber 4 is partitioned by partition walls 9 by the printing process to provide respective independent plasma chambers $P_1, P_2, P_3, \ldots P_n$.

Ionizable gas is filled into respective plasma chambers $P_1, P_2, P_3, \ldots P_n$. As the ionizable gas, helium, neon, argon, or a mixture of such gases may be used.

The above-mentioned partition walls 9 are formed in parallel to the respective strip-shaped electrodes of the discharge electrode groups 7, and in the gaps between these strip-shaped electrodes. In this embodiment, the partition walls are provided between every respective pair of an anode and a cathode which will be described later. Each anode and cathode pair make up a scanning unit. Accordingly, these plasma chambers $P_1, P_2, P_3, \ldots P_n$ correspond to respective scanning lines.

The partition walls 9 are formed by printing process. In particular, the partitions are formed by laminate-printing, e.g., with a glass paste many times in a screen printing process. Here, the partition walls 9 function to limit a gap interval W of the discharge chamber 4 (i.e., the distance between the second substrate 2 and the dielectric film 6). This is controlled by adjusting the number of screen printings. Ordinarily, the gap width W is about 200 μm.

Further, discharge electrode groups 7 in respective plasma chambers $P_1, P_2, P_3, \ldots P_n$ can be directly formed on the second substrate. For example, the electrode groups may be formed by printing on the substrate with a conductive paste including Ag powder, etc. Of course, the electrode groups may instead be formed by an etching process. Since the electrodes are being formed on a flat planer surface, they can be formed by nearly any process with ease. In addition, the dimensional accuracy of the electrode interval, etc.; can be ensured.

Accordingly, in manufacturing, discharge electrode groups 7 are first formed on the flat second substrate 2, and partition walls 9 are then formed by the printing process.

The overall configuration of the image display device has been described as above. In greater detail, the electrodes for driving the liquid crystal layer 3 are formed on the base plates 1 and 2, respectively. The configuration of these electrodes will now be described.

On the principal surface 1a of the first substrate 1 which lies opposite to the second substrate 2, a plurality of strip-shaped electrodes 5 having a predetermined width are formed. These electrodes 5 are formed of a transparent conductive material, e.g., Indium Tin Oxide (ITO), etc., and are optically transparent. Further, electrodes 5 are arranged in parallel to each other as can be better seen in FIG. 2 and are arranged perpendicularly to, for example, the display surface.

On the principal surface 2a of the second base plate 2 which lies opposite to the first base plate 1, groups of discharge electrodes 7 are similarly formed. These discharge electrode groups 7 are also parallel linear electrodes, but they are arranged in a direction perpendicular to the electrodes 5 formed on the first substrate 1. Namely, these discharge electrode groups 7 are arranged in a horizontal direction on the screen, while the electrodes 5 are in a vertical direction. More particularly, these discharge electrode groups 7 are comprised of anode electrodes $A_1, A_2, A_3 \ldots A_{n-1}, A_n$ and cathode electrodes $K_1, K_2, K_3, \ldots K_{n-1}, K_n$. By pairing these electrodes, respective discharge electrodes are provided. The discharge electrodes 7 are disposed within respective plasma chambers $P_1, P_2, P_3, \ldots P_n$.

Figure 2:
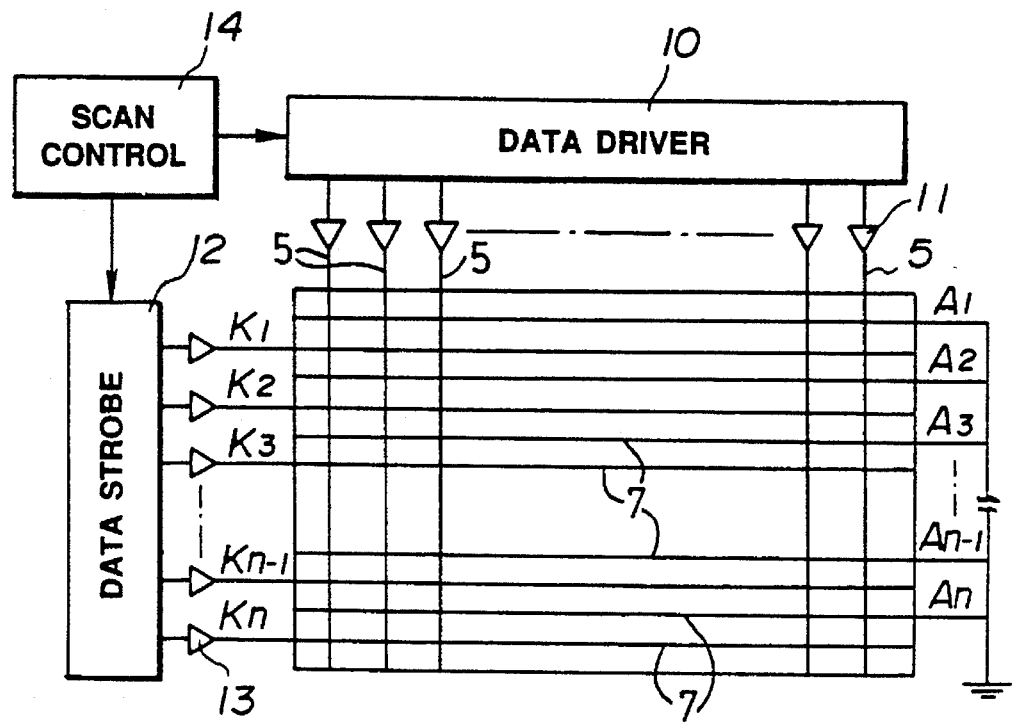
FIG. 2 is a schematic showing an electrode configuration for driving the liquid crystal layer of the device of FIG. 1.

The relative arrangement of the electrodes 5 formed on the first substrate 1 and the discharge electrode groups 7 formed on the second base plate 2 is shown in a schematic diagram in FIG. 2.

Here, a first signal application means that comprises a data driver circuit 10 and output amplifiers 11 is connected to the electrodes 5 on the first substrate 1. Analog voltages from the respective output amplifiers 11 are delivered as liquid crystal drive signals.

Second signal application means that comprises a data strobe circuit 12 and output amplifiers 13 is connected to respective cathode electrodes $K_1, K_2, K_3, \ldots K_{n-1}, K_n$, of the discharge electrode group 7 on the second substrate 2. Pulse voltages from the respective output amplifiers 12 are delivered as data strobe signals, respectively. In addition, a common reference voltage (which is ground voltage in the present embodiment) is applied to the respective anode electrodes $A_1, A_2, A_3 \ldots A_{n-1}, A_n$.

Figure 3:
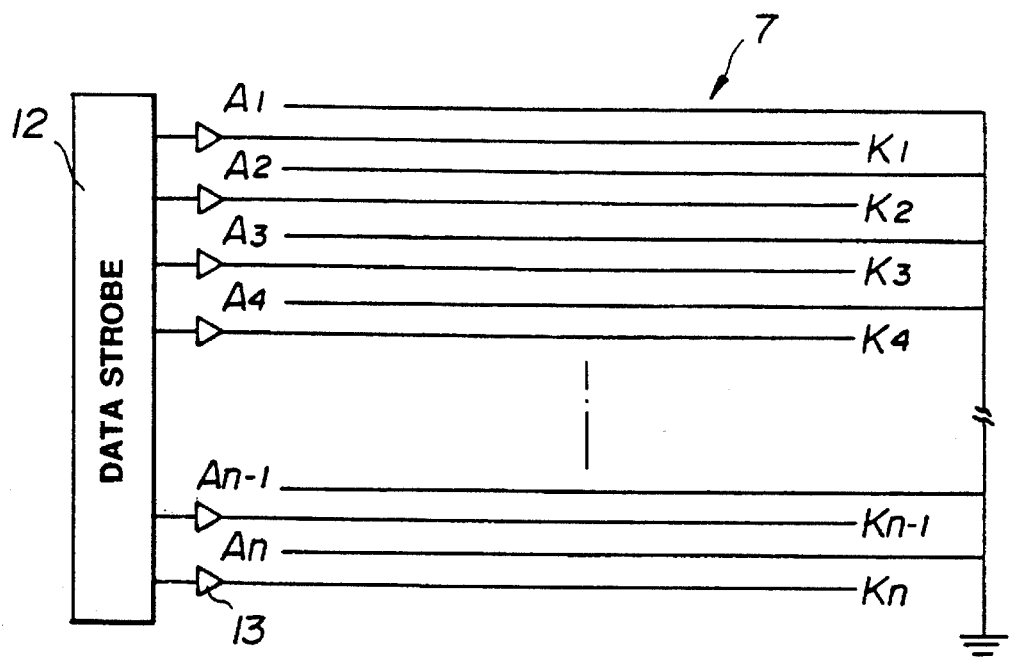
FIG. 3 is a schematic view showing an arrangement and connection state of discharge electrodes of the present invention.

The connection structure of the discharge electrode groups 7 formed on the second substrate 2 is as shown in FIG. 3.

To form an image over the entirety of the display screen, there is provided a scanning control circuit 14 connected to the data driver circuit 10 and the data strobe circuit 12. This scanning control circuit 14 serves to control or regulate the functions of the data driver circuit 10 and the data strobe circuit 12 to carry out sequential addressing from row to row with respect to all pixel trains of the liquid crystal layer 3.

In the image display device constructed as described above, the liquid crystal layer 3 functions as a sampling capacitor for analog voltages applied to the electrodes 5 formed on the first substrate 1, and the discharge plasma generated in the discharge chamber 4 functions as a sampling switch. Thus, an image is displayed.

Figure 4:
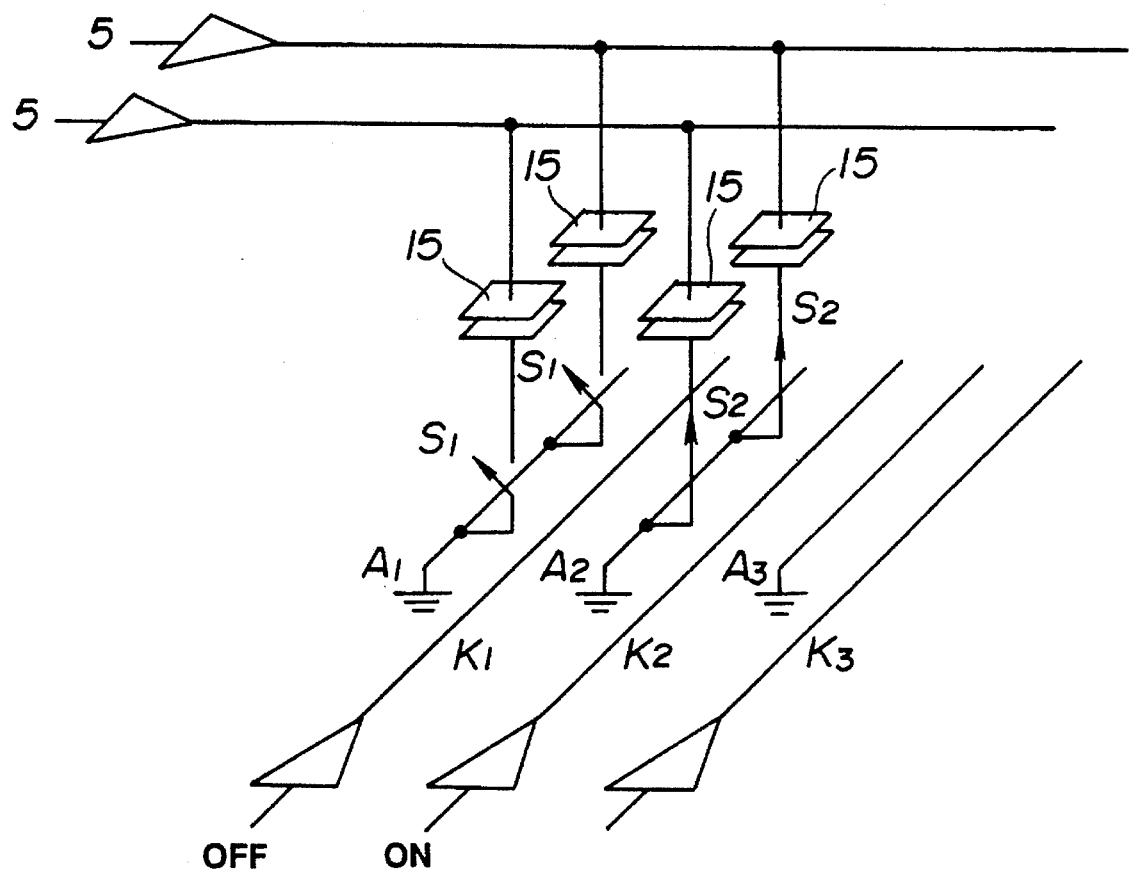
FIG. 4 is an equivalent circuit diagram for explaining an image display operation in the present device.

The diagram for explaining the image display operation is shown in FIG. 4. In FIG. 4, the liquid crystal layer 3 corresponding to respective pixels can be understood as capacitors 15 in an equivalent circuit. Namely, the capacitors 15 indicate capacitive liquid crystal cells formed at the portions where the electrodes 5 and respective plasma chambers $P_1, P_2, P_3, \ldots P_n$ overlap with each other.

It is now assumed that analog voltages are applied to the respective electrodes 5 by the data driver circuit 10. Here, assuming that no data strobe signal (pulse voltage) is applied to the cathode electrode $K_1$ of the second substrate 2, i.e., the cathode electrode $K_1$ is in an OFF state, so that no discharge is produced by the anode electrode $A_1$ and the cathode electrode $K_1$. As a result, gas in the vicinity thereof is in a non-ionized state. Accordingly, the plasma switch $S_1$ (the electrical connection of the electrode 5 and the anode electrode Al) is also in an OFF state. As a result, even if any analog voltage is applied to the electrodes 5, there is no change in the potential applied to the respective capacitors 15.

On the other hand, if a data strobe signal is applied to the cathode electrode K2 of the second base plate 2, i.e. , the cathode electrode K2 is in an ON state, gas is ionized by discharge between the anode electrode $A_2$ and the cathode electrode $K_2$, so an ionized region (plasma discharge) takes place within the plasma chamber $P_2$ Thus, in the so-called plasma switching operation, the electrode 5 and the anode electrode $A_2$ are electrically connected. Namely, in the circuit operation, the plasma switch $S_2$ is turned ON.

As a result, an analog voltage delivered to the electrode 5 is stored in a capacitor 15 of the column where the cathode electrode $K_2$ is in a strobe state. Even after the strobe or pulse to the cathode electrode $K_2$ is completed, no discharge plasma is dissipated or lost for a time period until next strobe is carried out (during at least a field interval of that image), and this analog voltages remains in the state where it is stored in the respective capacitor 15. As a result, this analog voltages does not undergo the influence of changes at subsequent times of analog voltages applied to the electrodes 5.

Accordingly, when an approach is employed to allow the cathode electrodes $K_1, K_2, K_3 \ldots K_{n-}, K_n$ to be subjected to sequential addressing to apply data strobe signals to the plasma chambers $P_1, P_2, P_3, \ldots P_n$, and to apply at the same time liquid crystal drive signals as analog voltages to the respective electrodes 5 in synchronism with the application of the data strobe signals, the plasma switches function as active elements in the same manner as in the case of the semiconductor elements such as thin film transistors, etc. Thus, the liquid crystal layer 3 is driven in the same manner as in the case of the active matrix addressing system.

It is to be noted that it is a matter of course that the drive system for an image display device is not limited to the above-described system.

In the above-described embodiment, respective paired electrodes (an anode and a cathode) are arranged as a discharge electrode within the plasma chambers $P_1, P_2, P_3, \ldots P_n$. In addition, by forming partition walls by the printing process, it is possible to increase the degree of the electrode position and the number of electrodes.

Explanation will now be given in connection with an embodiment in which partition walls are formed on the electrode, thus to reduce the number of discharge electrodes by one half.

Figure 5:
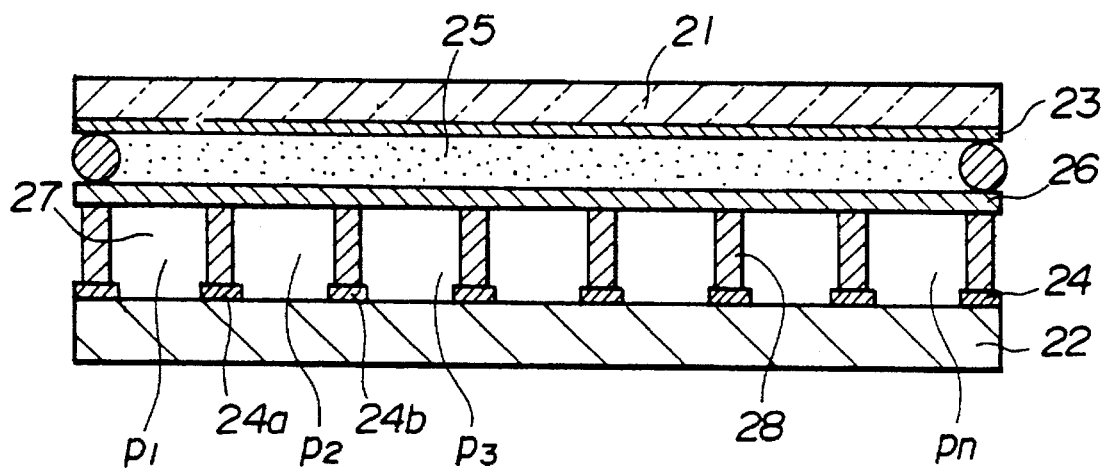
FIG. 5 is a schematic cross sectional view showing another embodiment of an electro-optical image display device according to this invention.
Figure 6:
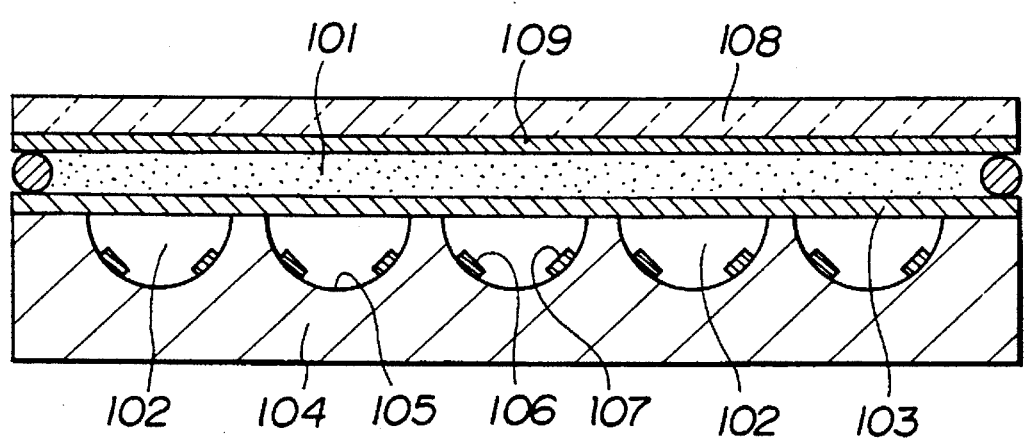
FIG. 6 is a schematic cross sectional view showing one example of conventional image display devices.

Also in an electro-optical device applied to an image display device of the second embodiment, as shown in FIG. 5, between a first substrate 21 including strip-shaped electrodes 23 formed thereon and a second substrate 22 including discharge electrodes 24 formed thereon, a liquid crystal layer 25 serving as an electro-optical material layer is inserted. Further, a space between the dielectric film 26 and the second substrate 22 is caused to serve as a discharge region 27. This configuration is similar to the corresponding above-described embodiment.

This embodiment is characterized in that discharge electrodes 24 on the second substrate 22 are arranged at equal intervals, and that partition walls 28 are formed by the printing process on the respective discharge electrodes 24, whereby the discharge chamber is divided into respective plasma chambers $P_1, P_2, P_3, \ldots P_n$. Such a configuration can be accomplished for the first time by print-forming partition walls 28 partitioning the discharge region 26.

In the case where partition walls 28 are print-formed on the discharge electrode 24 in a manner as described above, in the respective plasma chambers $p_1, p_2, p_3, \ldots p_n$ partitioned by these partition walls 28, discharge electrodes 24 are commonly used. Namely, for example, the discharge electrode 24a serves as both a discharge electrode of one plasma chamber $p_1$ and a discharge electrode of another plasma chamber $p_2$. Similarly, the discharge electrode 24b serves as both a discharge electrode of the plasma chamber $P_2$ and a discharge electrode of the plasma chamber $P_3$. Accordingly, the number of electrodes can be reduced to one half.

Further, since there is employed a structure such that partition walls 28 which do not contribute to the display overlap the discharge electrodes 24, the aperture or opening ratio can be improved, thus making it possible to improve the optical characteristics.

It is to be noted that in the case where discharge electrodes 24 are arranged in such a manner that they are commonly used for adjacent plasma chambers, it is necessary to revise somewhat the drive system. For example, it is sufficient to adopt an approach to allow respective discharge electrodes 24 to serve as both anode and cathode to sequentially carry out switching between the anode and the cathode to allow the timings thereof to be in correspondence with each other to thereby sequentially carry out discharge at respective plasma chambers $p_1, p_2, p_3, \ldots p_n$ While explanation has been given in connection with the actual embodiments to which this invention is applied, this invention is not limited to such embodiments. Namely, the material, the shape and the dimensions, etc. are arbitrary. In addition, while, in the above-described embodiments, the partition walls are print-formed for every scanning unit, the partition walls may instead be formed every two or more scanning units.

As is clear from the foregoing description, in accordance with this invention, that since partition walls dividing the discharge region are formed by the printing process, the difficult process of etching of grooves or formation of electrodes in the grooves is unnecessary, and the manufacturing is made easy. Further, this invention is advantageous for large display screens and high accuracy.

In addition, in accordance with this invention, by allowing the discharge electrodes to be overlapped by the partition walls, the area occupied thereby is reduced. Thus, the aperture ratio is improved. Accordingly, the efficiency is improved. This is also advantageous to the optical characteristic.

Although other modifications and changes may be suggested by those skilled in the art, it is the intention of the inventors to embody within the patent warranted hereon all changes and modifications as reasonably and properly come within the scope of their contribution to the art.

I claim:

1. An electro-optical device, comprising:

a first substrate having a plurality of non-overlapping first electrodes formed on a major surface of said first substrate;

a second substrate opposed to said first substrate and having a plurality of non-overlapping second electrodes on a major surface of said second substrate, said second electrodes being disposed substantially perpendicular to said first electrodes;

an electro-optical material layer positioned between inner surfaces of said first and second substrates; and a discharge chamber formed between said electro-optical material layer and said second substrate, and containing an ionizable gas, said discharge chamber having a plurality of printed partition walls so as to define scanning units within said discharge chamber, said scanning units each including an adjacent pair of said second electrodes which are drivable to form a plasma discharge between said adjacent second electrodes.

2. An electro-optical device as claimed in claim 1, wherein said printed partition walls are formed between adjacent pairs of said second electrodes.

3. An electro-optical device as claimed in claim 1, wherein said printed partition walls are formed between every pair of said second electrodes.

4. An electro-optical device as claimed in claim 1, wherein at least two pairs of said second electrodes lies between each adjacent pair of said printed partition walls.

5. An electro-optical device, comprising:

first substrate having a plurality of non-overlapping first electrodes formed on a major surface of said first substrate;

a second substrate opposed to said first substrate and having a plurality of non-overlapping second electrodes on a major surface of said second substrate, said second electrodes being disposed substantially perpendicular to said first electrodes;

an electro-optical material layer positioned between inner surfaces of said first and second substrates; and a discharge chamber formed between said electro-optical material layer and said second substrate, and containing an ionizable gas, said discharge chamber having a plurality imprinted partition walls so as to define scanning units within said discharge chamber, said scanning each including an adjacent pair of said second electrodes which are drivable to form a plasma discharge between said adjacent second electrodes said printed partition walls being formed on said second electrodes.

6. An electro-optical device as claimed in claim 3, further including:

a dielectric material layer positioned between said electro-optical material layer and said discharge chamber.

7. An electro-optical device as claimed in claim 5, wherein said second electrodes comprises pairs of anode and cathode electrodes.

8. An electro-optical device as claimed in claim 5, wherein said second electrodes comprise printed electrodes.

9. An electro-optical device as claimed in claim 5, wherein said electro-optical material layer comprises a liquid crystal.

10. An electro-optical device as claimed in claim 5, wherein each of the walls has a smaller width than that of said second electrodes.

11. An electro-optical device as claimed in claim 5, further including:

a dielectric material layer positioned between said electro-optical material layer and said discharge chamber, wherein said printed partition walls have an upper surface which contacts said dielectric material layer so as to support to said dielectric material layer.

12. An electro-optical device, comprising:

a first substrate having a plurality of non-overlapping first electrodes formed on a major surface of said first substrate;

a second substrate opposed to said first substrate and having a plurality of non-overlapping second electrodes on a major surface of said second substrate, said second electrodes being disposed substantially perpendicular to said first electrodes, said major surface of said second substrate being substantial planar;

an electro-optical material layer disposed between said major surfaces of said first and second substrates;

a plurality of partition walls formed on said substantially planar surface of said second substrate and extending perpendicularly therefrom to said electro-optical material, said partition walls extending substantially parallel to said second electrodes and being disposed between pairs of said second electrodes to form discharge chambers, said partition walls having wall surfaces substantially perpendicular to said major surfaces of said first and second substrates, and an ionizable gas in said discharge chambers which forms a plasma discharge between adjacent ones of said second electrodes when said adjacent ones are driven by a drive voltage.

13. An electro-optical device as claimed in claim 15, wherein said partition walls are formed on said major surface of said second substrate by printing.

14. An electro-optical device as claimed in claim 12, wherein each of the walls has a smaller width than that of said second electrodes.

15. An electro-optical device as claimed in claim 12, wherein said electro-optical material layer comprises a liquid crystal.

16. An electro-optical device as claimed in claim 12, wherein each of the walls has a smaller width than that of said second electrodes.

17. An electro-optical device as claimed in claim 12, further comprising:

a dielectric material layer positioned between said electro-optical material layer and said discharge chamber.

18. An electro-optical device as claimed in claim 17, wherein said printed partition walls have an upper surface which contacts said dielectric material layer so as to support said dielectric material layer.

19. An electro-optical device as claimed in claim 12, wherein said partition walls are formed between every pair of said second electrodes.

20. An electro-optical device as claimed in claim 12, wherein at least two pairs of said second electrodes lies between each adjacent pair of said partition walls.

21. An electro-optical device as claimed in claim 12, wherein said second electrodes comprises pairs of anode and cathode electrodes.

22. An electro-optical device as claimed in claim 12, wherein said second electrodes comprise printed electrodes.

* * * * *